US009152251B2

(12) United States Patent
Jin et al.

(10) Patent No.: US 9,152,251 B2
(45) Date of Patent: Oct. 6, 2015

(54) SCAN DRIVING CIRCUIT AND METHOD OF REPAIRING THE SAME

(75) Inventors: Guang-Hai Jin, Yongin (KR);
Jae-Beom Choi, Yongin (KR);
Kwan-Wook Jung, Yongin (KR);
June-Woo Lee, Yongin (KR); Moo-Jin Kim, Yongin (KR); Jong-Hyun Choi, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 277 days.

(21) Appl. No.: 13/477,204

(22) Filed: May 22, 2012

(65) Prior Publication Data

US 2013/0147773 A1    Jun. 13, 2013

(30) Foreign Application Priority Data

Dec. 8, 2011    (KR) .......................... 10-2011-0131119

(51) Int. Cl.
*G09G 3/30*    (2006.01)
*G09G 3/32*    (2006.01)
*G06F 3/038*    (2013.01)

(52) U.S. Cl.
CPC *G06F 3/038* (2013.01); *G09G 3/30* (2013.01); *G09G 3/3266* (2013.01); *G09G 2330/08* (2013.01)

(58) Field of Classification Search
USPC .............................................. 377/64
See application file for complete search history.

(56) References Cited

U.S. PATENT DOCUMENTS

| | | | |
|---|---|---|---|
| 2001/0028429 A1* | 10/2001 | Wu | 349/139 |
| 2010/0001941 A1* | 1/2010 | Shin et al. | 345/98 |
| 2010/0158186 A1* | 6/2010 | Moon et al. | 377/76 |
| 2011/0007067 A1* | 1/2011 | Ryu et al. | 345/214 |

FOREIGN PATENT DOCUMENTS

| | | |
|---|---|---|
| JP | 06-067200 A | 3/1994 |
| KR | 10-2006-0092667 A | 8/2006 |
| KR | 10-2007-0079615 A | 8/2007 |

* cited by examiner

*Primary Examiner* — Quan-Zhen Wang
*Assistant Examiner* — Chad Dicke
(74) *Attorney, Agent, or Firm* — Lee & Morse, P.C.

(57) ABSTRACT

A scan driving circuit includes a shift register configured to sequentially output a first scan signal to scan lines through respective first output lines during a first section of a frame period, a simultaneous switching block configured to simultaneously output a second scan signal to the scan lines through respective second output lines during a second section of the frame period, the first and second periods of the frame period being different from each other, a switching device electrically connected to the second output line, and a repair line across the first output line and the second output line.

20 Claims, 7 Drawing Sheets

SCAN DRIVING CIRCUIT AND METHOD OF REPAIRING THE SAME

CROSS-REFERENCE TO RELATED PATENT APPLICATION

This application claims the benefit of Korean Patent Application No. 10-2011-0131119, filed on Dec. 8, 2011, in the Korean Intellectual Property Office, the disclosure of which is incorporated herein in its entirety by reference.

BACKGROUND

1. Field

Example embodiments relate to a scan driving circuit and a method of repairing the same.

2. Description of the Related Art

A variety of flat panel display apparatuses capable of reducing weight and volume has been recently developed. Flat panel display apparatuses include liquid crystal display (LCD) apparatuses, field emission display (FED) apparatuses, plasma display panel (PDP) apparatuses, and organic light emitting diode (OLED) display apparatuses.

Among flat panel display apparatuses, OLED display apparatuses display an image using organic light emitting diodes that generate light by a recombination of electrons and holes, and are advantageous due to their fast response speed and low power consumption. OLED display apparatuses include a panel and driving circuits for driving the panel. In the panel, a plurality of scan lines and a plurality of data lines are arranged to cross each other, and pixels including thin film transistors (TFTs) are formed in a region defined by vertically crossing the scan lines and the data lines.

Among the driving circuits, a scan driving circuit for sequentially or simultaneously driving the scan lines includes circuit blocks capable of outputting scan signals to the scan lines. Thus, if a defect occurs in the circuit blocks, the panel is abnormally driven and thus is determined to be defective.

SUMMARY

Example embodiments provide a scan driving circuit capable of easily repairing a defect that occurs in any circuit block included in a scan driving circuit, and a method of repairing the scan driving circuit.

According to an aspect of the example embodiments, there is provided a scan driving circuit including a shift register configured to sequentially output a first scan signal to scan lines through respective first output lines during a first section of a frame period, a simultaneous switching block configured to simultaneously output a second scan signal to the scan lines through respective second output lines during a second section of the frame period, the first and second periods of the frame period being different from each other, a switching device electrically connected to the second output line, and a repair line across the first output line and the second output line.

The switching device may be configured to turn off when the first scan signal is output and to turn on when the second scan signal is output.

At least one layer of insulation film may be disposed to separate the first output line, the second output line, and the repair line.

The second output line and the repair line may be electrically connected to each other.

The second output line and the repair line may be electrically connected to each other at a point where the second output line and the repair line cross each other.

A plurality of the second output lines may be electrically connected to each other via the repair line.

A defective simultaneous switching block may be electrically separated from a respective second line.

An input line of the simultaneous switching block may be cut.

A first terminal of the switching device may be electrically connected to the second output line at a point where the second output line and the repair line cross each other, and a second terminal of the switching device is electrically connected to the scan line.

According to another aspect of the example embodiments, there also is provided a scan driving circuit including a plurality of stages, each stage including a first output line configured to sequentially output a first scan signal to scan lines during a first section of a frame period, and a second output line configured to simultaneously output a second scan signal to the scan lines during a second section of the frame period, the first and second sections of the frame period being different from each other, a plurality of switching devices corresponding to the plurality of stages, each switching device being electrically connected to a second output line of a respective stage, and a repair line across the first output lines and the second output lines of the stages.

The switching device may be configured to turn off when the first scan signal is output and to turn on when the second scan signal is output.

At least one layer of insulation film may separate the first output line, the second output line, and the repair line.

The second output line and the repair line may be electrically connected to each other at a point where the second output line and the repair line cross each other in at least two of the plurality of stages.

An input line of at least one of the plurality of stages may be cut.

Each of the plurality of stages may include a shift register for outputting the first scan signal through the first output line, and a simultaneous switching block for outputting the second scan signal through the second output line.

According to another aspect of the example embodiments, there is also provided a method of repairing a scan driving circuit having a plurality of stages, each of the plurality of stages including a shift register for sequentially outputting a first scan signal to scan lines through a first output line during a first section of a frame period, and a simultaneous switching block for simultaneously outputting a second scan signal to the scan lines through a second output line during a second section, different than the first section, of the frame period, the method including forming a repair line across the first output line and the second output line over the plurality of stages, cutting an input line of a first simultaneous switching block, the first simultaneous switching block being defective, electrically connecting a second output line of the first simultaneous switching block and the repair line, and electrically connecting a second output line of a second simultaneous switching block and the repair line, the second simultaneous switching block being non-defective.

The input line may be cut by irradiating a laser beam thereto.

The second output lines and the repair line may be electrically connected to each other through laser welding at their respective intersection points.

BRIEF DESCRIPTION OF THE DRAWINGS

The above and other features and advantages of the example embodiments will become more apparent by describing in detail exemplary embodiments thereof with reference to the attached drawings, in which.

DETAILED DESCRIPTION

Hereinafter, exemplary embodiments will be described more fully with reference to the accompanying drawings. In the following description, well-known functions or constructions will not be described in detail if it is determined that they would obscure the invention due to unnecessary detail.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the example embodiments.

As used herein, the term "and/or" includes any and all combinations of one or more of the associated listed items. Expressions such as "at least one of," when preceding a list of elements, modify the entire list of elements and do not modify the individual elements of the list.

Figure 1:
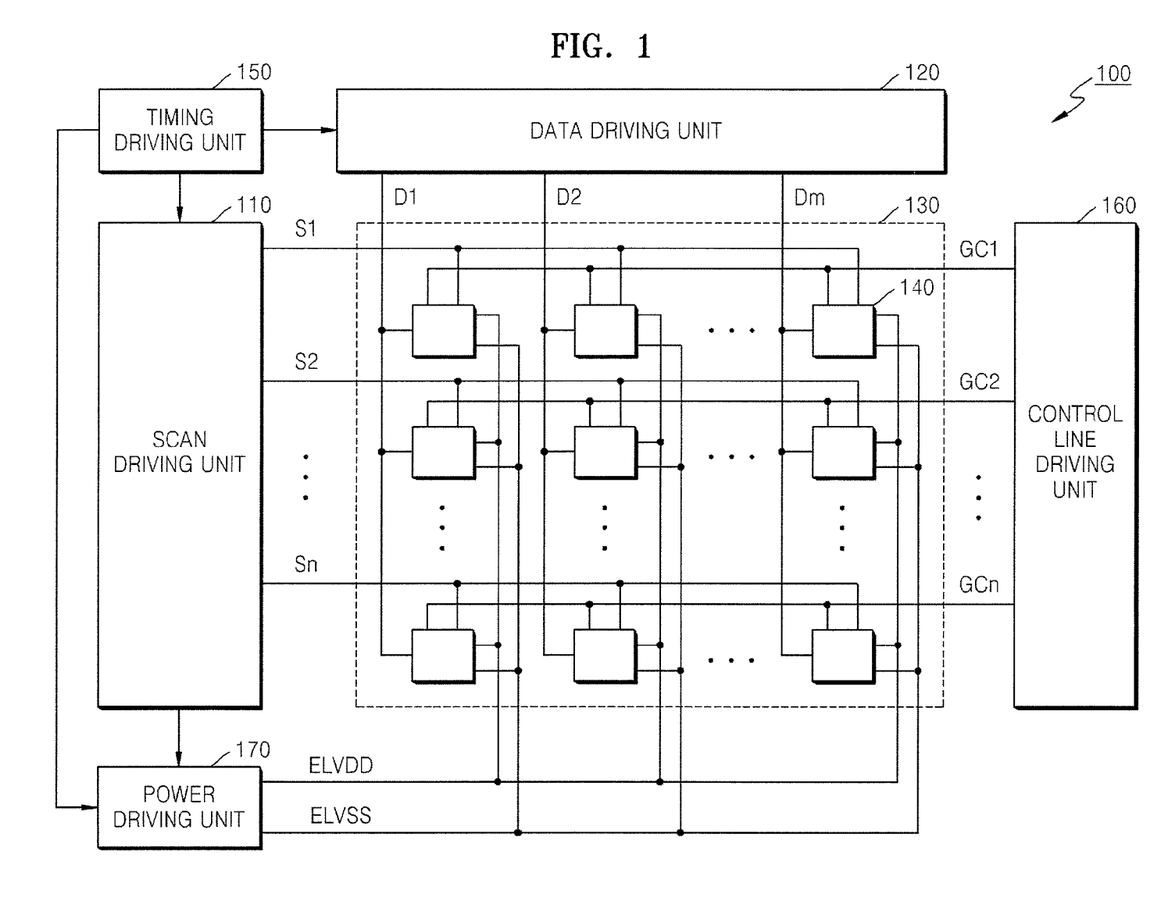
FIG. 1 is a circuit diagram of an organic light emitting diode (OLED) display apparatus according to an embodiment.

FIG. 1 is a circuit diagram of an organic light emitting diode (OLED) display apparatus 100 according to an embodiment of the example embodiments. Referring to FIG. 1, the OLED display apparatus 100 includes a pixel unit 130 that includes pixels 140 connected to scan lines S1 to Sn, control lines GC1 to GCn, data lines D1 to Dm, and first and second power supply lines ELVDD and ELVSS. The OLED display apparatus 100 also includes a scan driving unit 110 for providing each pixel 140 with a scan signal through the scan lines S1 to Sn, a control line driving unit 160 for providing each pixel 140 with a control signal through control lines GC1 to GCn, a data driving unit 120 for providing each pixel 140 with a data voltage through the data lines D1 to Dm, and a timing control unit 150 for controlling the scan driving unit 110, the data driving unit 120, and the control line driving unit 160. The OLED display apparatus 100 of the present embodiment includes a power driving unit 170 for providing each pixel 140 with a first power supply ELVDD(t) through the first power supply line ELVDD and a second power supply ELVSS(t) through the second power supply line ELVSS.

The pixel unit 130 includes the pixels 140 located at intersections of the scan lines S1 to Sn and the data lines D1 to Dm. The pixels 140 control an intensity of current supplied from the first power supply line ELVDD to the second power supply line ELVSS through an organic light-emitting device in response to the data voltages. Then, the organic light-emitting device emits light having a predetermined brightness. However, in the present embodiment, at least one of the first power supply ELVDD(t) and the second power supply ELVSS(t) is applied to the pixels 140 of the pixel unit 130 as voltage values of different levels during one frame period.

The power driving unit 170 may receive control signals for driving the first power supply ELVDD(t) and the second power supply ELVSS(t). The control signals are generated by the timing control unit 150 or the scan driving unit 110. To this end, the power driving unit 170 is controlled by the timing control unit 150 and generates the first power supply ELVDD(t) and the second power supply ELVSS(t). The first power supply ELVDD(t) and the second power supply ELVSS(t) may be driven using the following three methods.

The first method is to apply the first power supply ELVDD(t) as a voltage value of three different levels and the second power supply ELVSS(t) as a voltage value of a fixed low level (for example, ground). In this case, the power driving unit 170 outputs a voltage value of a constant level (for example, ground (GND)) of the second power supply ELVSS(t), which does not need a circuit block for driving the second power supply ELVSS(t), thereby reducing circuit expense. However, the first power supply ELVDD(t) needs a negative voltage value (for example, −3V) among the three levels, which may involve a complex circuit for generating the first power supply ELVDD(t).

The second method is to apply the first power supply ELVDD(t) and the second power supply ELVSS(t) each as a voltage value of two levels. In this case, the power driving unit 170 includes circuit blocks for driving the first power supply ELVDD(t) and the second power supply ELVSS(t).

The third method opposite to the first method is to apply the first power supply ELVDD(t) as a voltage value of a fixed high level and the second power supply ELVSS(t) as a voltage value of three different levels. In this case, the power driving unit 170 outputs a voltage value of a constant level of the first power supply ELVDD(t), which does not need a circuit block for driving the first power supply ELVDD(t), thereby reducing circuit expense. However, the second power supply ELVSS(t) needs a positive voltage value among the three levels, which may involve a complex circuit for generating the second power supply ELVSS(t).

In addition, embodiments may be applied to various driving methods in which the first power supply ELVDD(t) and the second power supply ELVSS(t) vary with respect to time.

Figure 2:
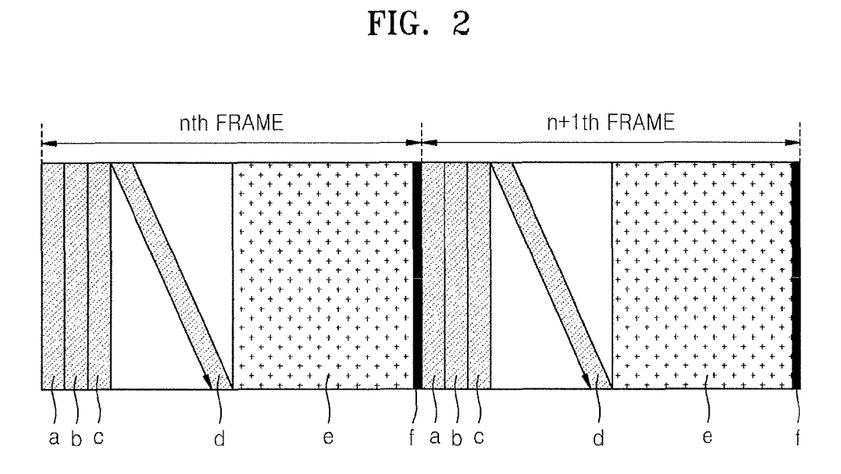
FIG. 2 is a diagram for explaining a method of driving an OLED display apparatus according to an embodiment.
Figure 3:
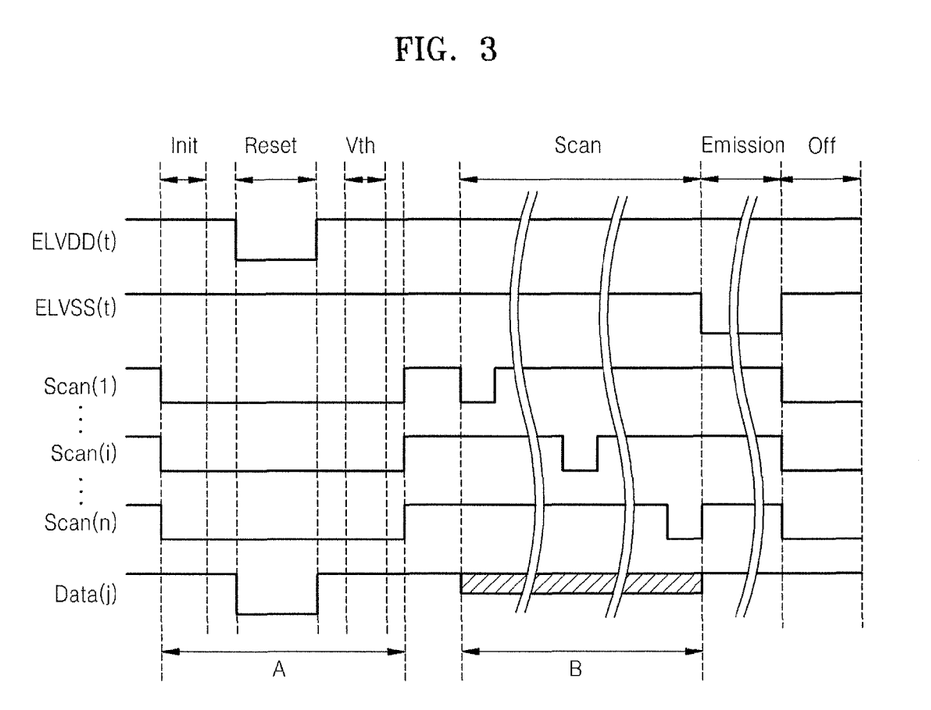
FIG. 3 is a timing diagram of driving pixels according to an embodiment.

FIG. 2 is a diagram for explaining a method of driving the OLED display apparatus 100 according to an embodiment. FIG. 3 is a timing diagram of driving the pixels 140 according to an embodiment.

The method of driving the OLED display apparatus 100 of the present embodiment may be applied to a simultaneous emission method. The simultaneous emission method sequentially inputs data during one frame period, after the data is completely input, and simultaneously emits all the pixels 140 included in the pixel unit 130.

More specifically, referring to FIG. 2, the method of driving the OLED display apparatus 100 of the present embodiment includes (a) an initializing operation, (b) a resetting operation, (c) a threshold voltage compensating operation, (d) a scanning operation (a data inputting operation), (e) an emitting operation, and (f) an emission off operation. The (d)

scanning operation (data inputting operation) is sequentially performed per scan line, whereas the (a) initializing operation, (b) resetting operation, (c) threshold voltage compensating operation, (e) emitting operation, and (f) emission off operation are simultaneously performed in the entire pixel unit 130 as shown in FIG. 2.

In this regard, the (a) initializing operation initializes a voltage of each node of a pixel circuit included in each of the pixels 140 to a voltage when a threshold voltage of a driving transistor is input. The (b) resetting operation resets a data voltage applied to each of the pixels 140 of the pixel unit 130, in which a voltage of an anode of an organic light-emitting device drops below a voltage of a cathode thereof to prevent the organic light-emitting device from being emitted. The (c) threshold voltage compensating operation compensates for a threshold voltage of a driving transistor included in each of the pixels 140. The (f) emission off operation turns the pixels 140 off or turns on a black insertion or dimming after each of the pixels 140 is emitted.

Thus, signals applied in the (a) initializing operation, (b) resetting operation, (c) threshold voltage compensating operation, (e) emitting operation, and (f) emission off operation, i.e., scan signals applied to the scan lines S1 to Sn, the first power supply ELVDD(t) and/or the second power supply ELVSS(t) applied to the each of the pixels 140, and control signals applied to the control lines GC1 to GCn, are simultaneously applied as a predetermined voltage level to the pixels 140 included in the pixel unit 130.

The simultaneous emission method of the present embodiment described above clearly classifies the (a) to (f) operations temporally, thereby advantageously reducing the number of transistors of compensation circuits included in the pixels 140 and the number of signal lines for controlling the transistors as well as easily implementing a shutter glasses type 3D display. The shutter glasses type 3D display implements a 3D effect when a user wears shutter glasses having transmittances of left and right eyes switched to 0% and 100% and watches a screen displayed by the pixel unit 130 of an image display apparatus, i.e. the OLED display apparatus 100, the screen alternately outputs a left eye image and a right eye image per frame, and thus the user sees the left eye image with the left eye and the right eye image with the right eye.

Referring to FIG. 3, each pixel 140 is driven by using the "simultaneous emission method" and is divided into an initialization section Init, a reset section Reset, a threshold voltage compensation section Vth, a scan/data input section Scan, an emission section Emission, and an emission off section Off, per frame.

In this regard, scan signals Scan(i) are sequentially input with respect to each scan line in the scan/data input section, and data signals are sequentially input to the pixels 140 in response to the scan signals Scan(i), whereas signals having voltage values of previously set levels, i.e. the first power supply ELVDD(t), a scan signal(i), and a data signal Data(j), are simultaneously applied to the pixels 140 included in the pixel unit 130 in the other sections. That is, operations of compensating for the threshold voltage of the driving transistor included in each pixel 140 and emitting each pixel 140 are simultaneously performed in all the pixels 140 included in the pixel unit 130 per frame.

Figure 4:
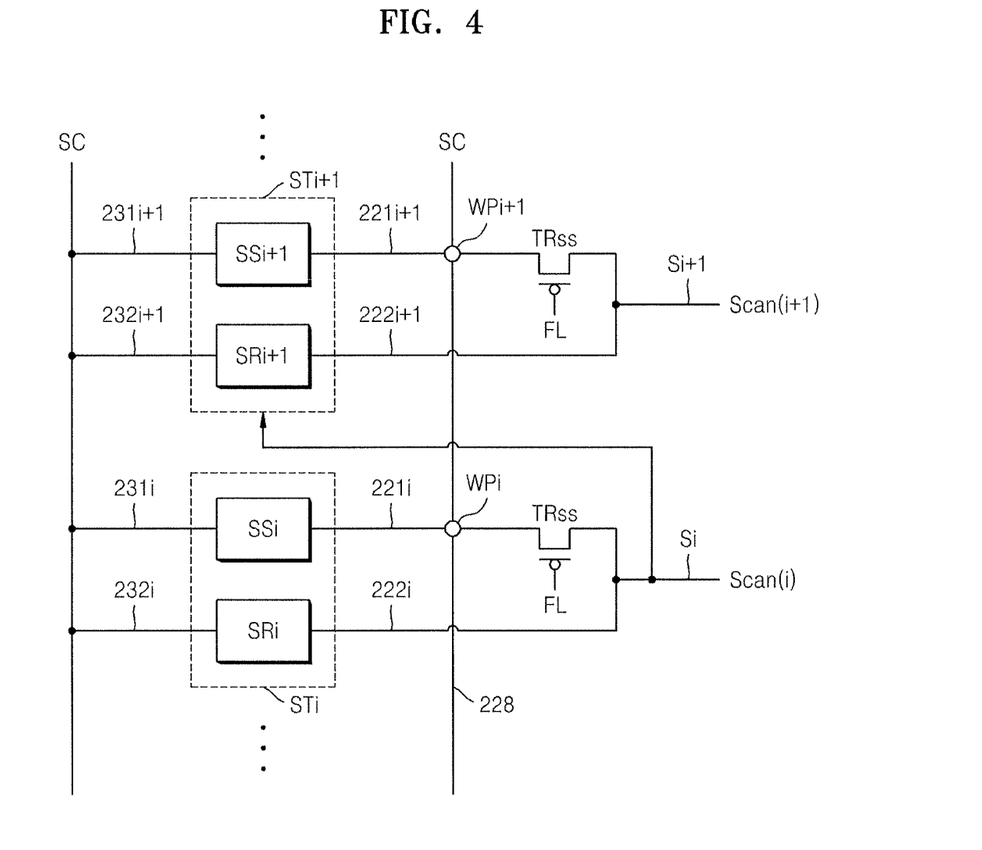
FIG. 4 is a circuit diagram of an internal construction of a scan driving unit according to an embodiment.
Figure 5:
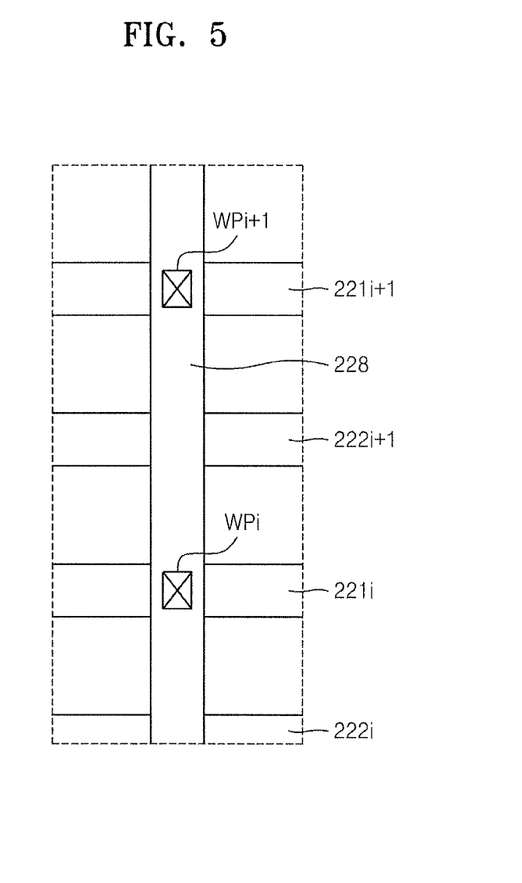
FIG. 5 is an enlarged plan view of a part of a repair line of FIG. 4.

FIG. 4 is a circuit diagram of an internal construction of the scan driving unit 110 according to an embodiment. FIG. 5 is an enlarged plan view of a part of a repair line 228 of FIG. 4.

Referring to FIG. 4, the scan driving unit 110 includes a plurality of stages that output scan signals to the plurality of scan lines S1 to Sn. Each stage includes a simultaneous switching circuit SS and a shift register block SR.

One end of the simultaneous switching circuit SS is connected to a first input line 231, and another end thereof is connected to a first output line 221. One end of the shift register block SR of each stage is connected to a second input line 232, and another end thereof is connected to a second output line 222. FIG. 4 illustrates an ith stage STi and an i+1th stage STi+1 for convenience of illustration.

The simultaneous switching circuit SS operates in a section "a" in which the scan signals Scan(i) are simultaneously applied to all the pixels 140 in the timing diagram of FIG. 3. Hereinafter, a simultaneous switching circuit SSi of the ith stage STi will now be described, and a construction and operation thereof will apply to simultaneous switching circuits of other stages.

One end of the simultaneous switching circuit SSi is connected to the first input line 231$i$, and another end thereof is connected to the first output line 221$i$. The simultaneous switching circuit SSi receives a clock signal and a control signal from a signal line SC through the first input line 231$i$. The simultaneous switching circuit SSi outputs a first scan signal Scan(i)_1 through the first output line 221$i$. A switching device TRss for controlling an output of the first scan signal Scan(i)_1 is connected to the first output line 221$i$.

One terminal (a source or a drain) of the switching device TRss is electrically connected to the first output line 221$i$, and another terminal (the drain or the source) is electrically connected to the scan line Si. A control signal FL is applied to a gate of the switching device TRss. The switching device TRss is turned on if the control signal FL of a low level is applied thereto, and outputs the first scan signal Scan(i)_1 to a scan line Si through the first output line 221$i$. The switching device TRss is turned off if the control signal FL of a high level is applied thereto, and blocks an output of the first scan signal Scan(i)_1 to the scan line Si. The control signal FL may use a signal inside or outside the ith stage STi.

Although the switching device TRss is implemented as a p-type metal-oxide semiconductor (PMOS) transistor in the present embodiment, the method of driving the OLED display apparatus 100 of the present embodiment may be applied by implementing the switching device TRss as an n-type metal-oxide semiconductor (NMOS) transistor and inverting a signal.

The shift register block SR operates in a section "b" in which the scan signals Scan(i) are sequentially applied to scan lines in the timing diagram of FIG. 3. Hereinafter, an ith shift register block SRi of the ith stage STi will now be described, and a construction and operation thereof will apply to shift register blocks of other stages.

One end of the ith shift register block SRi is connected to the second input line 232$i$, and another end thereof is connected to the second output line 222$i$. The ith shift register block SRi receives a clock signal and a control signal from the signal line SC through the second input line 232$i$. The ith shift register block SRi outputs an ith second scan signal Scan(i)_2 through the second output line 222$i$. The second output line 222$i$ is connected to the scan line Si.

The scan line Si outputs the first scan signal Scan(i)_1 in a section (a) and the ith second scan signal Scan(i)_2 in a section (b).

The ith second scan signal Scan(i)_2 output from the ith shift register block SRi is applied to an i+1th shift register block SRi+1 of a next stage. The i+1th shift register block SRi+1 receives the ith second scan signal Scan(i)_2 from the ith shift register block SRi and outputs an i+1th second scan signal Scan(i+1)_2.

Although the signal line SC is drawn in a single line for convenience of illustration in FIG. 4, the signal line SC may include one or more clock supply lines and control signal supply lines.

Figure 9:
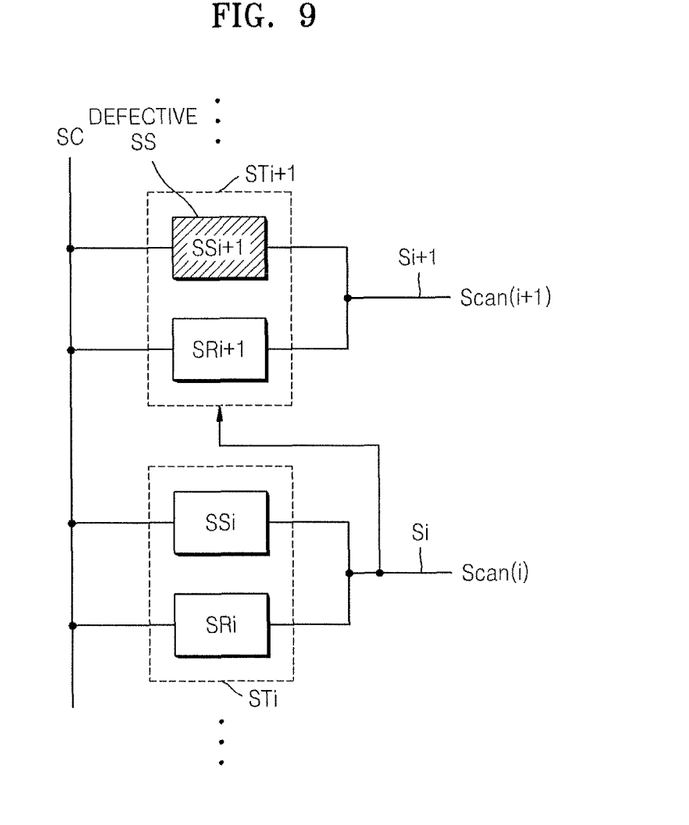
FIG. 9 is a circuit diagram of a scan driving unit according to a comparison example.

FIG. 9 is a circuit diagram of a scan driving unit 110' according to a comparison example. Referring to FIG. 9, a scan driving unit 110' of the comparison example includes a plurality of stages that output scan signals to the plurality of scan lines S1 to Sn. Each stage includes a simultaneous switching block SS and a shift register block SR. All simultaneous switching blocks SS simultaneously output a first scan signal with respect to all scan lines. If a defect occurs in an i+1th simultaneous switching block SS, pixels connected to a corresponding i+1 th scan line do not operate normally due to the defect, thereby causing a defective panel.

Therefore, according to example embodiments, abnormal driving of a defective simultaneous switching block SS may be repaired through the repair line 228 by repairing a signal output from the defective simultaneous switching block SS, as will be explained in more detail below with reference to FIGS. 6-7. As such, a panel with an improved operability and reliability is realized.

Referring back to FIGS. 4 and 5, the repair line 228 is formed in top portions of the first and second output lines 221 and 222 of the simultaneous switching block SS and the shift register block SR of each stage in such a way that the repair line 228 and the first and second output lines 221 and 222 may cross each other. A welding point WP for laser welding is formed in a portion where the first output line 221 of the simultaneous switching block SS and the repair line 228 cross each other. In FIGS. 4 and 5, a welding point WPi is formed in a portion where the first output line 221$i$ of the ith simultaneous switching block SSi and the repair line 228 cross each other, and a welding point WPi+1 is formed in a portion where a first output line 221$i$+1 of the i+1th simultaneous switching block SSi+1 and the repair line 228 cross each other. The welding point WP is a point where the first output line 221 and the repair line 228 cross each other and are electrically connected to each other through welding processing, and may or may not have a separate construction such as a protrusion type. For example, the repair line 228 extends across a plurality of first output lines 221, so the first output lines 221 of adjacent simultaneous switching blocks SS may be electrically connected to each other via the repair line 228, e.g., when an output of a defective unit is repaired.

At least one layer of an insulation film 105 (FIG. 7) is disposed between the first and second output lines 221 and 222 and the repair line 228 to electrically separate the first and second output lines 221 and 222 from the repair line 228. The insulation film 105 may be a gate insulation film.

Figure 6:
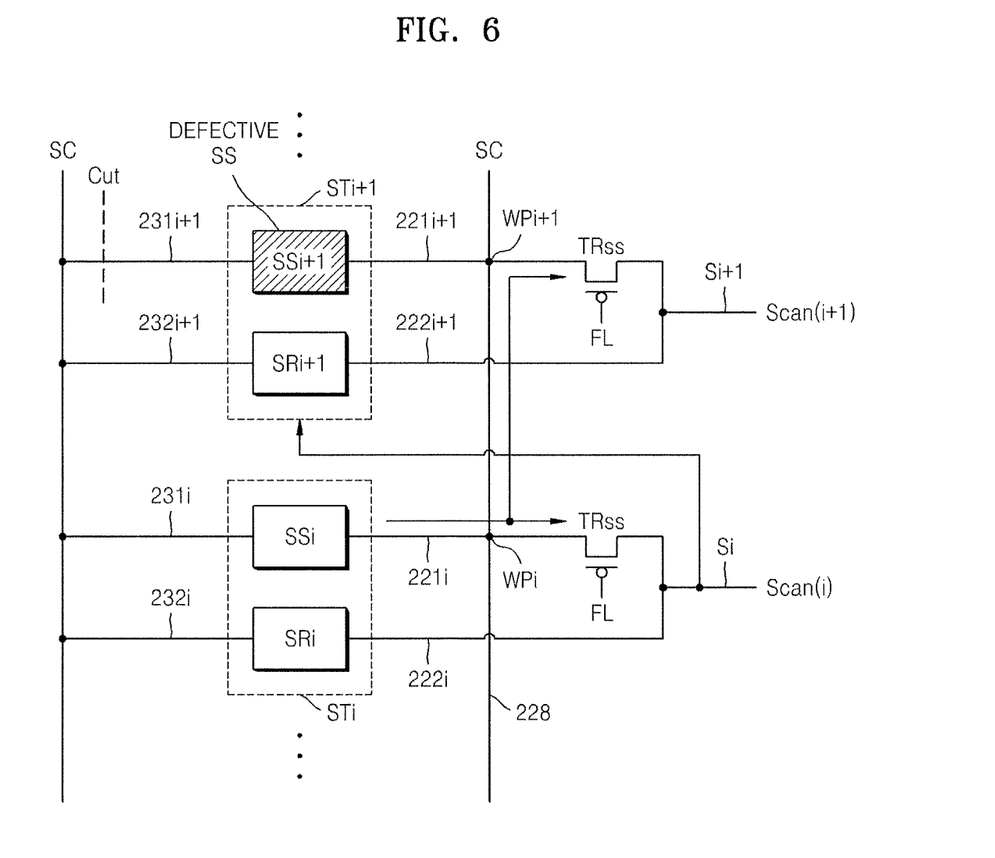
FIG. 6 is a circuit diagram for explaining a method of repairing a scan driving unit including a defective stage according to an embodiment.

FIG. 6 is a circuit diagram for explaining a method of repairing the scan driving unit 110 including a defective stage according to an embodiment. FIG. 7 is a cross-sectional view for explaining laser welding of the repair line 228 of FIG. 6.

Since input and output signals of all simultaneous switching blocks SS are the same, and the output signals are simultaneously output, an output signal of a non-defective simultaneous switching block SS may be output through an output line of a defective, e.g., adjacent, simultaneous switching block SS. As such an abnormal driving of the defective simultaneous switching block SS, e.g., due to its incorrect output, may be repaired.

In detail, referring to FIG. 6, when the i+1th simultaneous switching block SSi+1 is defective and is in an inoperable state, e.g., due to shorted/open circuit wires or switching devices thereof, the output of the i+1th simultaneous switching block SSi+1 may be defective, e.g., the first scan signal Scan(i+1)_1 that is an output signal of the i+1th simultaneous switching block SSi+1 may not be output, a driving timing may not be in order, or a signal having a value different from a set value may be output. Accordingly, the i+1th simultaneous switching block SSi+1 is electrically separated from the signal line SC, e.g., by irradiating a laser beam onto a part of the first input line 231$i$+1 of the i+1th simultaneous switching block SSi+1 and cutting the first input line 231$i$+1, to stop the defective output.

Next, the repair line 228 is used to provide a proper output through the i+1th simultaneous switching block SSi+1. That is, first lines 221 of simultaneous switching block SS may be electrically connected to each other via the repair line 228, so the defective simultaneous switching block SSi+1 may be bypassed by outputting a scan signal from the ith simultaneous switching block SSi through the output line of the i+1th simultaneous switching block SSi+1 via the repair line 228.

Figure 7:
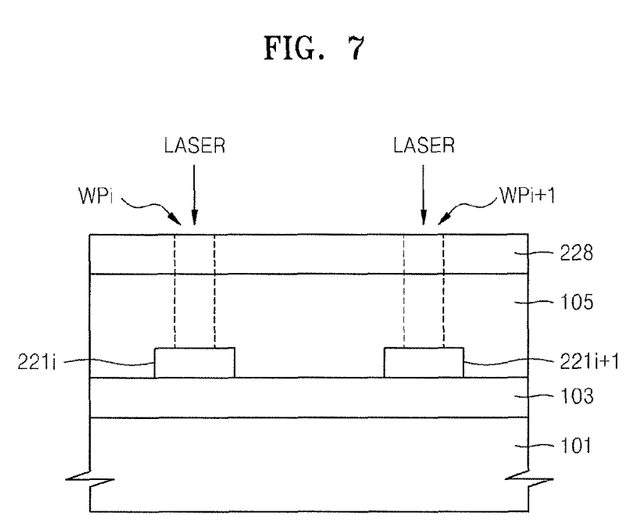
FIG. 7 is a cross-sectional view for explaining laser welding of a repair line of FIG. 6.

In detail, referring to FIG. 7, the repair line 228 is formed across the first output line 221 in top portions of the first output line 221 of the simultaneous switching block SS and the insulation film 105 on a substrate 101. For example, the repair line 228 is formed in top portions of the first output line 221$i$ of the ith simultaneous switching block SSi, the first output line 221$i$+1 of the i+1th simultaneous switching block SSi+1, and the insulation film 105. It is noted that the second output line 222$i$ of the ith shift register block SRi between the first output lines 221$i$ and 221$i$+1 is omitted in FIG. 7 for convenience of description. Further, an auxiliary layer 103, e.g., a barrier layer, a blocking layer, and/or a buffer layer, may be formed on a top surface of the substrate 101 to prevent impurity ions from spreading, prevent moisture or external air from transmitting, and to planarize a surface of the substrate 101.

Laser welding is performed by irradiating a laser beam onto the welding point WPi+1 formed in a portion where the first output line 221$i$+1 of the i+1th simultaneous switching block SSi+1 and the repair line 228 cross each other, and the welding point WPi formed in a portion where the first output line 221$i$ of the ith simultaneous switching block SSi and the repair line 228 cross each other. Thus, the repair line 228 is electrically connected to the first output lines 221$i$ and 221$i$+1 in the welding point WPi and the welding point WPi+1. Accordingly, the first output line 221$i$+1 of the i+1th simultaneous switching block SSi+1 and the first output line 221$i$ of the ith simultaneous switching block SSi are electrically connected to each other via the repair line 228. Thus, the first scan signal Scan(i)_1 output from the ith simultaneous switching block SSi may be output through the first output line 221$i$+1 of the i+1th simultaneous switching block SSi+1 via the repair line 228.

Although the ith simultaneous switching block SSi adjacent to the i+1th simultaneous switching block SSi+1 is used to repair the i+1th simultaneous switching block SSi+1 in the present embodiment, since the welding point WP may be formed corresponding to each simultaneous switching block SS, the i+2th simultaneous switching block SSi+2 adjacent to the i+1th simultaneous switching block SSi+1 or a simultaneous switching block SS not adjacent thereto may be used.

Figure 8:
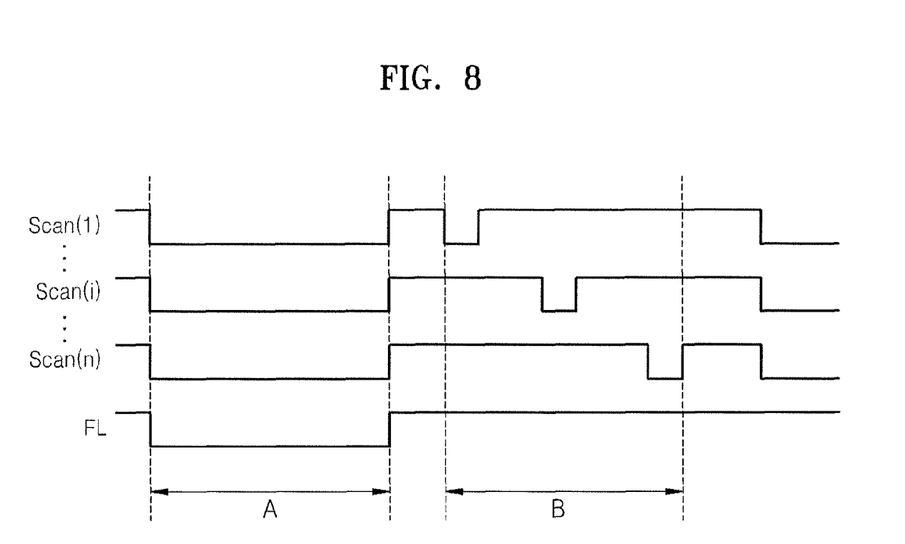
FIG. 8 is a timing diagram for explaining an operation of a scan driving unit including a repaired stage according to an embodiment.

FIG. 8 is a timing diagram for explaining an operation of the scan driving unit 110 including a repaired stage according to an embodiment.

Referring to FIGS. 6 and 8, in the section "a" in which the scan signals Scan(i) are simultaneously applied to all the pixels 140, the control signal FL of a low level is applied to a gate of the switching device TRss connected to the first output line 221 of the simultaneous switching block SS, and the switching device TRss is turned on. Accordingly, all the simultaneous switching blocks SS simultaneously output a first scan signal to a scan line S through the switching device TRss. In this regard, the first scan signal output by the simultaneous switching block SSi that is electrically connected to the repaired simultaneous switching block SSi+1 and normally operates is output to the scan line Si through the first output line 221*i* and is simultaneously output to the scan line Si+1 through the first output line 221*i*+1 via the repair line 228. Therefore, although a defect occurs in the simultaneous switching block SSi+1, the OLED display apparatus 100 is normally driven.

In the section "b", in which the scan signals Scan(i) are sequentially applied to all the pixels 140, the control signal FL of a high level is applied to a gate of the switching device TRss connected to the first output line 221 of the simultaneous switching block SS, and the switching device TRss is turned off. Thus, the shift register block SR sequentially outputs second scan signals.

According to the example embodiments, if a defect occurs in a scan driving circuit, the scan driving circuit is easily repaired by using a repair line connected to the scan driving circuit by laser welding. The repair line may be connected to any circuit block of the circuit. Therefore, a manufacturing yield of a display apparatus may be enhanced.

While the example embodiments has been particularly shown and described with reference to exemplary embodiments thereof, it will be understood by those of ordinary skill in the art that various changes in form and details may be made therein without departing from the spirit and scope of the example embodiments as defined by the following claims.

What is claimed is:

1. A scan driving circuit, comprising:
 a plurality of shift registers to sequentially output first scan signals to scan lines through shift register output lines during a first section of a frame period;
 a plurality of simultaneous switching blocks to simultaneously output second scan signals to the scan lines through simultaneous switching block output lines during a second section of the frame period, the first and second sections of the frame period being different from each other;
 a plurality of switching devices between the simultaneous switching block output lines and the scan lines; and
 a repair line across the shift register output lines and the simultaneous switching block output lines, wherein:
 the plurality of simultaneous switching blocks include a normal simultaneous switching block and a defective simultaneous switching block, the normal simultaneous switching block connected to a first scan line of the scan lines through a first switching device of the switching devices and a first simultaneous switching block output line of the simultaneous switching block output lines, the defective simultaneous switching block connected to a second scan line of the scan lines through a second switching device of the switching devices and a second simultaneous switching block output line of the simultaneous switching block output lines,
 the first simultaneous switching block output line connected to the normal simultaneous switching block is electrically connected to the second simultaneous switching block output line connected to the defective simultaneous switching block through the repair line, and
 the normal simultaneous switching block simultaneously supplies a corresponding second scan signal of the second scan signals to the first scan line and the second scan line.

2. The scan driving circuit of claim 1, wherein the switching devices are to turn off when the first scan signals are output and to turn on when the second scan signals are output.

3. The scan driving circuit of claim 1, wherein at least one layer of insulation film is disposed to separate the shift register output lines, the simultaneous switching block output lines, and the repair line.

4. The scan driving circuit of claim 1, wherein an input line corresponding to the at defective simultaneous switching block is cut.

5. The scan driving circuit of claim 4, wherein the second simultaneous switching block output line connected to the defective simultaneous switching block and the repair line are electrically connected to each other at a point where the second simultaneous switching block output line connected to the defective simultaneous switching block and the repair line cross each other.

6. The scan driving circuit of claim 1, wherein the corresponding second scan signal output from the first simultaneous switching block output lines connected to the normal simultaneous switching block electrically connected to the repair line is output to the second scan line connected to the defective simultaneous switching block via the repair line, the second simultaneous switching block output line, and the second switching device.

7. The scan driving circuit of claim 1, wherein the second simultaneous switching block output line and the first simultaneous switching block output line is electrically connected to the second scan line and the first scan line, respectively, during the second section of the frame period.

8. The scan driving circuit of claim 1, wherein:
 a first terminal of each of the plurality of switching devices is electrically connected to a corresponding simultaneous switching block output line at a point where the corresponding simultaneous switching block output line and the repair line cross each other, and
 a second terminal of each of the plurality of switching devices is electrically connected to a corresponding scan line, the each of the plurality of switching devices electrically connecting the corresponding simultaneous switching block output line to the corresponding scan line.

9. The scan driving circuit of claim 1, wherein each scan line is connected to one shift register and to one simultaneous switching block through corresponding shift register and simultaneous switching block output lines, respectively.

10. The scan driving circuit of claim 1, wherein the first scan line is electrically connected to a first pixel, and the second scan line is electrically connected to a second pixel different from the first pixel.

11. A scan driving circuit, comprising:
 a plurality of stages including a plurality of shift registers to output first scan signals to scan lines through shift register output lines during a first section of a frame period; and a plurality of simultaneous switching blocks to simultaneously output second scan signals to the scan lines through simultaneous switching block output lines during a second section of the frame period, the first and second sections of the frame period being different from each other;
 a plurality of switching devices corresponding to the plurality of stages, each switching device being electrically connected to a simultaneous switching block output line of a respective stage; and
 a repair line across the shift register output lines and the simultaneous switching block output lines of the stages, wherein:

the plurality of simultaneous switching blocks include a normal simultaneous switching block and a defective simultaneous switching block, the normal simultaneous switching block connected to a first scan line of the scan lines through a first switching device of the switching devices and a first simultaneous switching block output line of the simultaneous switching block output lines, the defective simultaneous switching block connected to a second scan line of the scan lines through a second switching device of the switching devices and a second simultaneous switching block output line of the simultaneous switching block output lines, the first simultaneous switching block output line connected to the normal simultaneous switching block is electrically connected to the second simultaneous switching block output line connected to the defective simultaneous switching block through the repair line, and the normal simultaneous switching block simultaneously supplies a corresponding second scan signal of the second scan signals to the first scan line and the second scan line.

12. The scan driving circuit of claim 11, wherein the switching devices are to turn off when the first scan signals are output and to turn on when the second scan signals are output.

13. The scan driving circuit of claim 11, wherein at least one layer of insulation film separates the shift register output lines, the simultaneous switching block output lines, and the repair line.

14. The scan driving circuit of claim 11, wherein the second simultaneous switching block output line connected to the defective simultaneous switching block and the repair line are electrically connected to each other at a point where the second simultaneous switching block output line connected to the defective simultaneous switching block and the repair line cross each other.

15. The scan driving circuit of claim 14, wherein an input line of at least one of the plurality of stages is cut.

16. The scan driving circuit of claim 11, wherein the plurality of stages include:
    the shift registers to output respective first scan signals through respective shift register output lines; and
    the simultaneous switching blocks including a plurality of normal simultaneous switching blocks and the defective simultaneous switching block, the normal simultaneous switching blocks to output respective second scan signals through respective simultaneous switching block output lines.

17. The scan driving circuit of claim 11, wherein the shift register and simultaneous switching block output lines in each stage are electrically connected to a same scan line.

18. A method of repairing a scan driving circuit having a plurality of stages including shift registers to output first scan signals to scan lines through shift register output lines during a first section of a frame period, and simultaneous switching blocks to output second scan signals to the scan lines through simultaneous switching block output lines during a second section, different than the first section, of the frame period, the plurality of stages sequentially output the first scan signals to the scan lines during the first section and simultaneously output the second scan signals to the scan lines during the second section, wherein the simultaneous switching blocks include a normal simultaneous switching block and a defective simultaneous switching block, the normal simultaneous switching block connected to a first scan line of the scan lines through a first simultaneous switching block output line of the simultaneous switching block output lines, the defective simultaneous switching block connected to a second scan line of the scan lines through a second simultaneous switching block output line of the simultaneous switching block output lines, the method comprising:
    forming a repair line across the simultaneous switching block output lines over the plurality of stages;
    cutting an input line corresponding to the defective simultaneous switching block;
    electrically connecting the second simultaneous switching block output line connected to the defective simultaneous switching block and the repair line; and
    electrically connecting the first simultaneous switching block output line connected to the normal simultaneous switching block and the second simultaneous switching block output line connected to the defective simultaneous switching block through the repair line, wherein
    the normal simultaneous switching block simultaneously supplies a corresponding second scan signal of the second scan signals to the first scan line and the second scan line.

19. The method of claim 18, wherein the input line corresponding to the defective simultaneous switching block is cut by irradiating a laser beam thereto.

20. The method of claim 18, wherein the simultaneous switching block output lines and the repair line are electrically connected to each other through laser welding at their respective intersection points.

* * * * *